United States Patent
Funakoshi et al.

(10) Patent No.: US 9,012,559 B2
(45) Date of Patent: Apr. 21, 2015

(54) HEAT CURABLE ADHESIVE AND RESIN LAMINATED-TYPE IC CARD

(75) Inventors: Chihiro Funakoshi, Tsurugashima (JP); Yoshitomo Aoyama, Hiki-gun (JP)

(73) Assignee: Taiyo Holdings Co., Ltd., Tokyo (JP)

( * ) Notice: Subject to any disclaimer, the term of this patent is extended or adjusted under 35 U.S.C. 154(b) by 780 days.

(21) Appl. No.: 12/997,436

(22) PCT Filed: Jun. 10, 2009

(86) PCT No.: PCT/JP2009/002609
§ 371 (c)(1),
(2), (4) Date: Feb. 23, 2011

(87) PCT Pub. No.: WO2009/150832
PCT Pub. Date: Dec. 17, 2009

(65) Prior Publication Data
US 2011/0149541 A1   Jun. 23, 2011

(30) Foreign Application Priority Data

Jun. 10, 2008  (JP) .................................. 2008-151817

(51) Int. Cl.
| | |
|---|---|
| *H05K 7/00* | (2006.01) |
| *C09J 167/04* | (2006.01) |
| *C08L 67/00* | (2006.01) |
| *H05K 3/00* | (2006.01) |
| *G06K 19/07* | (2006.01) |
| *C09J 167/00* | (2006.01) |
| *B42D 25/00* | (2014.01) |
| *C08K 3/36* | (2006.01) |
| *C08L 25/08* | (2006.01) |
| *B42D 25/47* | (2014.01) |

(52) U.S. Cl.
CPC ............ *G06K 19/07* (2013.01); *B42D 2033/46* (2013.01); *C08K 3/36* (2013.01); *C08L 25/08* (2013.01); *C09J 167/00* (2013.01); *B42D 25/00* (2014.01); *B42D 25/47* (2014.01)

(58) Field of Classification Search
CPC ...... C09J 167/00; C09J 167/04; C09J 201/02; C09J 11/00; G06K 19/07; G06K 19/077; H05K 3/386
USPC .................................. 524/502, 539; 361/783
See application file for complete search history.

(56) References Cited

U.S. PATENT DOCUMENTS 3,962,520 A * 6/1976 Watanabe et al. ............. 428/414
2011/0149541 A1 * 6/2011 Funakoshi et al. ............ 361/783

FOREIGN PATENT DOCUMENTS

| JP | 60 135473 | 7/1985 | |
|---|---|---|---|
| JP | 04 328186 | 11/1992 | |
| JP | 2000 136366 | 5/2000 | |
| JP | 2000136366 A * | 5/2000 | |
| JP | 2001 216492 | 8/2001 | |
| JP | 2007 321004 | 12/2007 | |
| JP | 2007321004 A * | 12/2007 | |
| JP | 2008 019375 | 1/2008 | |
| WO | WO 2009150832 A1 * | 12/2009 | ............. C09J 167/00 |

OTHER PUBLICATIONS

Nichima et al.—JP2007-321004—machine translation.*
Sasaki et al.—JP2000-136366—machine translation.*
Nichima et al.—JP2007-321004 A—machine translation.*
Sasaki et al.—JP2000-136366 A—machine translation.*
English translation of International Preliminary Report on Patentability issued Jan. 11, 2011, in PCT/JP2009/002609.
English translation of Written Opinion of the International Searching Authority issued Aug. 25, 2009 in PCT/JP2009/002609.
International Search Report issued Aug. 25, 2009 in PCT/JP09/002609 filed Jun. 10, 2009.

* cited by examiner

*Primary Examiner* — Ling Choi
*Assistant Examiner* — Ronald Grinsted
(74) *Attorney, Agent, or Firm* — Oblon, McClelland, Maier & Neustadt, L.L.P.

(57) ABSTRACT

Provided is a heat curable adhesive that can strongly bond a base material formed of a crystalline polyester resin, can freely regulate the thickness of an adhesive layer, has excellent chemical resistance, and, at the same time, has excellent storage stability. Furthermore, provided is a resin laminated-type IC card, in which a liquid heat curable adhesive of which use has been difficult in the past can be used, and the liquid heat curable adhesive can be coated with a good accuracy by a printing method without the need to perform molding into a hot-melt sheet to bond a base material formed of a crystalline polyester resin. Accordingly, the resin laminated-type IC card can have a high degree of freedom in design of the thickness of an IC card. The heat curable adhesive comprises (a) a hydroxyl group-containing non-crystalline polyester resin, (b) a resin containing a carboxylic acid anhydride, and (c) a solvent for dissolving (a) the hydroxyl group-containing non-crystalline polyester resin.

13 Claims, No Drawings

HEAT CURABLE ADHESIVE AND RESIN LAMINATED-TYPE IC CARD

TECHNICAL FIELD

The present invention relates to improvement of a heat curable adhesive and a resin laminated-type IC card.

BACKGROUND ART

Crystalline polyester-based resins such as polyethylene telephthalate (PET), glycol-modified PET (PET-G) and polyethylene naphthalate (PEN) are used in various fields. For example, in the production of IC cards, a PET sheet is laminated on the outer layer of a sheet-like circuit substrate for an IC card, which is formed of an insulating resin on which electronic parts are mounted, to protect an IC card or maintain the form thereof. However, among plastics, a crystalline polyester-based resin such as PET has extremely low polarity, and thus when one tries to attach it by using an adhesive comprising a solvent, sufficient adhesion strength cannot be obtained.

Therefore, for example, Patent Document 1 discloses use of a hot melt-type sheet-like adhesive for attaching a PET sheet on the outer layer of a circuit substrate for an IC card by lamination. According to the hot melt-type sheet-like adhesive as disclosed in Patent Document 1, a base material formed of a crystalline polyester-based resin can be attached strongly, whereby an adhesive having excellent chemical resistance can be provided. However, the production of a hot melt-type sheet-like adhesive requires a step of forming an adhesive into a sheet-like shape by extrusion molding or the like.

Furthermore, a sheet-like adhesive has drawbacks that a certain thickness is required for the production of a sheet and thus it cannot be used for various sheet thicknesses. Therefore, an adhesive having a high degree of freedom in design of the thickness of an IC card is required.

Accordingly, in order to solve the problems, the applicant of the present patent application has previously proposed a heat curable adhesive characterized by comprising (a) a non-crystalline polyester resin containing a hydroxyl group, (b) a multifunctional polyisocyanate, (c) a solvent which dissolves the non-crystalline polyester resin, and (d) an agent for imparting thixotropy (Patent Document 2). The present invention can provide an adhesive having excellent chemical resistance. However, the invention had a problem that increase in thickening ratio during storage was high and storage stability was poor.

CITATION LIST

Patent Literature

Patent Literature 1: Japanese Patent Application Laid-Open No. 2001-216492, claims and the like
Patent Literature 2: Japanese Patent Application Laid-Open No. 2007-321004, claims and the like

SUMMARY OF INVENTION

Technical Problem

A general object of the present invention is to solve the above-mentioned problems, and the main object of the present invention is to provide an adhesive which is able to strongly bond a base material formed of a crystalline polyester resin and to freely adjust the thickness of an adhesive layer, having excellent chemical resistance as well as excellent storage stability.

Another object of the present invention is to provide a resin laminated-type IC card obtained by attaching a base material formed of a crystalline polyester-based resin to a circuit substrate by lamination using the above-mentioned adhesive.

Solution to Problem

The present invention has been made so as to solve the above-mentioned problems. The heat curable adhesive according to the present invention comprises (a) a non-crystalline polyester resin containing a hydroxyl group, (b) a resin containing a carboxylic acid anhydride, preferably a copolymerized resin of maleic anhydride and a monomer containing an unsaturated double bond, and (c) a solvent which dissolves the non-crystalline polyester resin (a), and more preferably comprises (d) an agent for imparting thixotropy.

Furthermore, a resin laminated-type IC card according to the present invention comprises a base material is laminated on a circuit substrate via the above-mentioned heat curable adhesive.

Advantageous Effects of Invention

According to the present invention, a liquid adhesive is provided which is able to strongly bond a base material formed of a crystalline polyester resin to a circuit board and to freely adjust the thickness of an adhesive layer, having excellent chemical resistance as well as excellent storage stability.

Furthermore, according to the present invention, a liquid heat curable adhesive, which has been difficult to use, can be used to bond a base material formed of a crystalline polyester resin to a circuit board by accurately applying the adhesive through a printing method without forming it into a hot-melt sheet. Therefore, a resin laminated-type IC card can be provided having a high degree of freedom in design of the thickness of the IC card.

DESCRIPTION OF EMBODIMENTS

Hereinafter the respective components of the heat curable adhesive of the present invention are explained.

(a) Non-Crystalline Polyester Resin Containing a Hydroxyl Group

The polyester resin (a) in the present invention is non-crystalline. Therefore, it can be dissolved in a solvent. For example, Vylon (registered trademark) 103, 200, 300, 500, 530, 560, 630, 670, GK130, GK180 and the like which are non-crystalline polyester resins, manufactured by Toyobo Co. Ltd. can be used for such non-crystalline polyester resin (a).

The non-crystalline polyester resin (a) in the present invention contains a hydroxyl group. Therefore, it reacts with a carboxylic acid anhydride. In order to cure the polyester resin, it must be a compound containing two or more carboxylic acid anhydrides in one molecule. A compound containing only one carboxylic acid anhydride in one molecule reacts with the hydroxyl group of the polyester resin (a) to quench the reaction. Therefore, the molecular weight of the polyester resin is not increased, and the action of the carboxylic acid anhydride as a curing agent is not exhibited sufficiently. Since the resin containing a carboxylic acid anhydride used in the present invention has two or more carboxylic acid anhydrides in one molecule, it acts to form a cross-linking bond in the polyester to cure the polyester resin. Particularly, it is preferable to use a branched non-crystalline polyester resin in the present invention since a more complicated network structure can be obtained readily.

(b) Resin Containing a Carboxylic Acid Anhydride

Examples of the resin containing a carboxylic acid anhydride which is applied to the present invention may include a copolymerized resin of maleic anhydride and a monomer containing an unsaturated double bond.

Examples of the copolymerized resin of maleic anhydride and a monomer containing an unsaturated double bond may include a styrene-maleic anhydride copolymer (SMA (registered trademark) resin, manufactured by Sartomer), an isobutylene-maleic anhydride copolymer (ISOBAM, manufactured by Kuraray Co., Ltd.) (registered trademark), a methyl vinyl ether-maleic anhydride copolymer (VEMA, manufactured by Daicel Chemical Industries, Ltd.) (registered trademark), as well as a radical-copolymerized compound of maleic anhydride and a monomer containing an unsaturated double bond. In the above-mentioned compounds, a part of the carboxylic acid anhydride may be half-esterified, free-carboxylated or imidized.

In the adhesive of the present invention, the resin containing a carboxylic acid anhydride (b) is included by preferably 1 to 30 parts by mass, more preferably 2 to 15 parts by mass with respect to 100 parts by mass of the non-crystalline polyester resin (a). When the resin containing a carboxylic acid anhydride (b) is too low, a number of cross-linking points are lowered, whereby chemical resistance is decreased. On the other hand, when the resin is too much, it is not preferable since the unreacted resin containing a carboxylic acid anhydride remains and causes decrease in chemical resistance.

(c) Solvent Which Dissolves Non-Crystalline Polyester Resin (a)

The adhesive of the present invention aims at being applied on a base material by a printing method. Therefore, the adhesive of the present invention contains a solvent (c) which dissolves the non-crystalline polyester resin (a). The solvent (c) contained in the adhesive of the present invention may be any solvent as long as it dissolves the non-crystalline polyester resin (a) and the resin containing a carboxylic acid anhydride (b), and may be selected suitably according to the printing method. For example, an ester-based solvent such as carbitol acetate, dipropylene glycol monomethyl ether acetate and propylene glycol monomethyl ether acetate may be used. Alternatively, an ultraviolet curable monomer having dilution effect may be used.

The adhesive of the present invention contains the solvent (c) by preferably 30 to 200 parts by mass, more preferably 50 to 150 parts by mass, with respect to 100 parts by mass of the non-crystalline polyester resin (a). When the solvent (c) is too low, the adhesive has high viscosity and printing property is deteriorated. On the other hand, when the solvent (c) is too much, it is not preferable since the adhesive has too low viscosity, and a desired film thickness becomes difficult to obtain.

(d) Agent for Imparting Thixotropy

The adhesive of the present invention may include an agent for imparting thixotropy (d). The agent for imparting thixotropy can prevent dripping and the like which occur during application of the adhesive of the present invention by a printing method, whereby can retain the printed form of the adhesive. Furthermore, the agent can improve printing property by preventing threading of the resin in the adhesive and preventing antisagging of the adhesive. Moreover, the agent can prevent surface roughening such as occurrence of orange peel during drying of the applied adhesive.

Examples of such agent for imparting thixotropy (d) may include micropowder silica, pulverized silica, organic bentonite, talc, smectite, clay, a polyamide resin and the like.

The adhesive of the present invention comprises the agent for imparting thixotropy (d) by preferably 0.1 to 200 parts by mass, more preferably 0.5 to 150 parts by mass, with respect to 100 parts by mass of the non-crystalline polyester resin (a). When the agent for imparting thixotropy (d) is too small, the above-mentioned effect is not exhibited sufficiently. On the other hand, when the agent is too much, it is not preferable since decrease in adhesive strength is caused.

Furthermore, in order to improve printing property, the adhesive of the present invention preferably comprises additives including a defoaming agent, a leveling agent and the like.

EXAMPLES

Hereinafter the present invention is specifically explained with referring to Examples and Comparative Examples, but the present invention should not be limited to the following Examples. Furthermore, the "part" refers to part by mass unless otherwise specified.

Example 1

Using a heating and dissolving pot, 50 parts of methoxypropyl acetate as a solvent was added to 50 parts of a branched and non-crystalline polyester resin Vylon 560 (trade name), manufactured by Toyobo Co. Ltd. (Mn=19,000; hydroxyl group value=8; Tg=7° C.), and the mixture was stirred at 100° C., dissolved completely and cooled to give varnish A. 2.5 parts of micropowder silica #200, manufactured by Japan Aerosil, and 0.2 part of a silicone oil KS-66 (trade name), manufactured by Shin-Etsu Chemical Co., Ltd. as a defoaming agent/leveling agent were incorporated into 100 parts of the varnish A, and the mixture was stirred and dispersed with a triple roll mill to give ink-like composition A.

5 parts of the styrene-maleic anhydride copolymer varnish A and 14 parts of a solvent (methoxypropyl acetate) were incorporated into 100 parts of the ink-like composition A, and the mixture was stirred to give adhesive A which can be screen-printed.

Example 2

Using a heating and dissolving pot, 50 parts of methoxypropyl acetate as a solvent was added to 50 parts of a non-branched and non-crystalline polyester resin Vylon 200 (trade name), manufactured by Toyobo Co. Ltd. (Mn=17,000; hydroxyl group value=6; Tg=67° C.), and the mixture was stirred at 100° C., dissolved completely and cooled to give varnish B. Each 50 parts of the varnish B and the varnish A obtained in Example 1 were mixed to give varnish C. 2.5 parts of micropowder silica #200, manufactured by Japan Aerosil, and 0.2 part of a silicone oil KS-66 (trade name), manufactured by Shin-Etsu Chemical Co., Ltd. as a defoaming agent/leveling agent were incorporated into 100 parts of the varnish C, and the mixture was stirred and dispersed with a triple roll mill to give ink-like composition B.

5 parts of the styrene-maleic anhydride copolymer varnish A and 14 parts of a solvent (methoxypropyl acetate) were incorporated into 100 parts of the ink-like composition B, and the mixture was stirred to prepare adhesive B which can be screen-printed.

Example 3

The styrene-maleic anhydride copolymer varnish A was incorporated into 100 parts of an ink-like composition prepared in a similar manner to Example 1 with changing the incorporation amount of the styrene-maleic anhydride copolymer varnish A from 5 parts as in Example 1 to 10 parts, and the mixture was stirred to prepare adhesive B which can be screen-printed. The kinds of other components incorporated and the contents thereof are the same as those in Example 1.

Example 4

5 parts of the styrene-maleic anhydride copolymer varnish B was incorporated instead of the styrene-maleic anhydride copolymer varnish A into 100 parts of an ink-like composition which was prepared in a similar manner to Example 1 and the mixture was stirred to prepare adhesive C which can be screen-printed. The kinds of other components incorporated and the contents thereof are the same as those in Example 1.

Comparative Example 1

An adhesive was prepared without adding the styrene-maleic anhydride copolymer varnish to 100 parts of an ink-like composition which was prepared in a similar manner to Example 1. The kinds of other components incorporated and the contents thereof are the same as those in Example 1.

Comparative Example 2

An adhesive was prepared by adding a styrene-acrylic acid copolymerized resin varnish instead of the styrene-maleic anhydride copolymer varnish to 100 parts of an ink-like composition which was prepared in a similar manner to Example 1.

The kinds of other components incorporated and the contents thereof are the same as those in Example 1.

Comparative Example 3

An adhesive was prepared by adding a multifunctional polyisocyanate instead of the styrene-maleic anhydride copolymer varnish to 100 parts of an ink-like composition which was prepared in a similar manner to Example 1. The kinds of other components incorporated and the contents thereof are the same as those in Example 1.

Comparative Example 4

Using a heating and dissolving pot, 50 parts of methoxypropyl acetate as a solvent was added to 50 parts of a crystalline polyester resin Vylon GA-400 (trade name), manufactured by Toyobo Co. Ltd. (Mn=25,000; Tg=19° C.), and the mixture was stirred at 100° C. However, the resin was not dissolved in the solvent and a varnish could not be obtained.

The adhesion property and storage stability of the thus-obtained adhesives of the Examples and Comparative Examples were tested.
(Test Condition of Adhesive Strength)

Using the adhesives of the Examples and Comparative Examples, adhesive strength was measured for the case when UV offset ink on a PVC film and a PVC film were attached and for the case when a PET film and a PET film were attached.

The former was obtained by applying a UV-curable offset ink (FD Carton ACE, manufactured by Toyo Ink) (trade name) by an offset printing method on the whole surface of a white PVC film (Vinyfoil, manufactured by Mitsubishi Plastics. Inc.) (registered trademark) having a thickness of 560 μm, and curing by UV irradiation at 200 mJ/cm$^2$. The adhesive prepared was solid-printed by a screen printing method on the whole surface of the offset ink applied on the PVC film by a film thickness of 40 μm using a 100 mesh polyester bias plate. This was dried in an IR drying furnace at 50° C. for 1 minute. A colorless transparent PVC film (Vinyfoil, manufactured by Mitsubishi Plastics. Inc.) having a thickness of 100 μm was put on this PVC film on which the dried adhesive had been applied, and bonded by heat-press bonding at 120° C. under a press pressure of 0.8 MPa for 20 minutes. Each was naturally cooled to room temperature, and cut into a desired card size to give a card having a laminate structure. The card having a laminate structure was left for a day under room temperature, and the obtained card was evaluated by the following test methods.

The latter was obtained by solid-printing the prepared adhesive by a screen printing method on the whole surface of a white PET film (Tetoron film U2, manufactured by Teijin Limited) (trade name) having a thickness of 250 μm using a 100 mesh polyester bias plate by a film thickness of 40 μm. This was dried at 80° C. for 30 minutes in a hot air circulation drying furnace. A similar white PET film was put on the PET film on which the dried adhesive has been applied, and attached by heat-press bonding at 120° C. under press pressure of 0.8 MPa for 20 minutes. The respective films were naturally cooled to room temperature, and cut into a desired card size to give a card having a laminate structure. The card having a laminate structure was left for a day under room temperature, and the obtained card was evaluated by the following test methods.
(Evaluation of Adhesive Strength)

Adhesive strength was evaluated according to the method for testing interlaminar peeling of JIS X6305-1. Examples had adhesive strengths of 10-16 N/cm under the former condition and had adhesive strengths of 8-12 N/cm under the latter condition.

On the other hand, Comparative Examples 1 and 2 had adhesive strengths of 0.5-2 and 0.5-1 N/cm which were not sufficient. Comparative Example 3 has an adhesive strength of 10 N/cm under the former condition and 8 N/cm under the latter condition, and thus has a similar adhesive strength to that of the present invention.
(Method for Testing Storage Stability)

The adhesives of the Examples and Comparative Examples were collected by 0.2 ml each, and the initial viscosity was measured by using a corn plate type viscometer (manufactured by Tokimec Inc.) under a condition of 25° C. and a rotation number of 5 rpm. Then, the adhesives of the Examples and Comparative Example were each put into three sealed containers by 200 g, and the containers were stored in thermostat bathes of −10° C., 20° C. and 40° C. for 48 hours. 0.2 ml of the stored adhesive was collected, and the viscosity after storage was measured by using a corn plate type viscometer (manufactured by Tokimec) under a condition of 25° C. and a rotation number of 5 rpm. The storage stability was evaluated by calculating a thickening ratio Δ% by using the following equation.

$$\text{Thickening ratio } \Delta\% = (\text{viscosity after storage for 48 hours} - \text{initial viscosity})/\text{initial viscosity} \times 100$$

(Evaluation of Storage Stability)

All of the Examples have excellent storage stability. Comparative Examples 1 and 2 have similar storage stability to that of the present invention, but Comparative Example 3 is poor in storage stability.

(Comprehensive Evaluation)

Examples all have both high adhesive strength and excellent storage stability, whereas Comparative Examples 1 and 2 which have excellent storage stability had weak adhesive strength, and Comparative Example 3 which have high adhesive strength is poor in storage stability. An adhesive could not be prepared in Comparative Example 4.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Formulation |  |  |  |  |  |  |  |
| Non-crystalline polyester resin varnish A (nonvolatile component 50%) *1 | 100.00 | 50.00 | 100.00 | 100.00 | 100.00 | 100.00 | 100.00 |
| Non-crystalline polyester resin varnish B (nonvolatile component 50%) *2 |  | 50.00 |  |  |  |  |  |
| Styrene-maleic anhydride copolymerized resin varnish A (nonvolatile component 50%) *3 | 5.00 | 5.00 | 10.00 |  |  |  |  |
| Styrene-maleic anhydride copolymerized resin varnish B (nonvolatile component 50%) *4 |  |  |  | 5.00 |  |  |  |
| Styrene-acrylic acid copolymerized resin varnish (nonvolatile component 50%) *5 |  |  |  |  |  | 5.00 |  |
| Multifunctional polyisocyanate *6 |  |  |  |  |  |  | 1.50 |
| Defoamant | 0.20 | 0.20 | 0.20 | 0.20 | 0.20 | 0.20 | 0.20 |
| Microparticle silica | 2.50 | 2.50 | 2.50 | 2.50 | 2.50 | 2.50 | 2.50 |
| Solvent (methoxypropyl acetate) | 14.00 | 14.00 | 14.00 | 14.00 | 14.00 | 14.00 | 14.00 |
| Total | 121.70 | 121.70 | 126.70 | 121.70 | 116.7 | 121.70 | 118.2 |
| Adhesion strength (N/cm) |  |  |  |  |  |  |  |
| PVC/UV offset ink press condition (0.8 MPa 120° C. 20 minutes) | 16 | 14 | 14 | 10 | 0.5 | 2 | 10 |
| PET/PET press condition (0.8 MPa 120° C. 20 minutes) | 12 | 10 | 10 | 8 | 0.5 | 1 | 8 |
| Storage stability (thickening ratio Δ %) |  |  |  |  |  |  |  |
| Storage condition (−10° C., 48 hours) | 0.5 | 0.5 | 1.0 | 0.3 | 0.0 | 1.0 | 15.0 |
| Storage condition (20° C., 48 hours) | 1.5 | 1.5 | 2.0 | 1.0 | 0.5 | 2.0 | 100.0 |
| Storage condition (40° C., 48 hours) | 9.0 | 9.0 | 10.0 | 5.0 | 1.0 | 10.0 | 300.0 |

Comparative Example 4: formulation and data were not obtained since an adhesive could not prepared.
*1 Polyester resin varnish A (nonvolatile component 50%); Vylon 560, manufactured by Toyobo Co. Ltd./solvent (methoxypropyl acetate) = 50/50
*2 polyester resin varnish B(nonvolatile component 50%); Vylon 200, manufactured by Toyobo Co. Ltd./solvent (methoxypropyl acetate) = 50/50
*3 Styrene-maleic anhydride copolymerized resin varnish A (nonvolatile component 50%); SMA base resin, manufactured by Sartomer (styrene:maleic anhydride = 1:1)/solvent (methoxypropyl acetate) = 50/50
*4 Styrene-maleic anhydride copolymerized resin varnish B (nonvolatile component 50%); SMA base resin, manufactured by Sartomer (styrene:maleic anhydride = 3:1)/solvent (methoxypropyl acetate) = 50/50
*5 Styrene-acrylic acid copolymerized resin varnish (nonvolatile component 50%); Joncryl resin, manufactured by Johnson Polymer/solvent (methoxypropyl acetate) = 50/50
*6 Multifunctional polyisocyanate; biuret type, manufactured by Asahi Kasei Chemicals Corporation

TABLE 2

|  | Characteristic | Example 1 | Example 2 | Example 3 | Example 4 | Comparative Example 1 | Comparative Example 2 | Comparative Example 3 |
| --- | --- | --- | --- | --- | --- | --- | --- | --- |
| Adhesion strength (N/cm) | PVC/UV offset ink press condition (0.8 MPa 120° C. 20 minutes) | 16 | 14 | 14 | 10 | 0.5 | 2 | 10 |
|  | PET/PET press condition (0.8 MPa 120° C. 20 minutes) | 12 | 10 | 10 | 8 | 0.5 | 1 | 8 |
| Storage stability (thickening ratio Δ %) | Storage condition (−10° C., 48 hours) | 0.5 | 0.5 | 1.0 | 0.3 | 0.0 | 1.0 | 15.0 |
|  | Storage condition (20° C., 48 hours) | 1.5 | 1.5 | 2.0 | 1.0 | 0.5 | 2.0 | 100.0 |
|  | Storage condition (40° C., 48 hours) | 9.0 | 9.0 | 10.0 | 5.0 | 1.0 | 10.0 | 300.0 |

As mentioned above, according to the present invention, a liquid curable adhesive of which use has been difficult in the past can be used, and the liquid heat curable adhesive can be applied with a good accuracy by a printing method without the need to perform molding into a hot-melt sheet to bond a base material formed of a crystalline polyester resin, and at the same time, has excellent storage stability.

The invention claimed is:

1. A heat curable adhesive comprising:
   a non-crystalline polyester resin containing a hydroxyl group;
   a styrene-maleic anhydride copolymer reactive with the non-crystalline polyester resin upon application of heat; and
   a solvent which dissolves the non-crystalline polyester resin.

2. The heat curable adhesive according to claim 1, further comprising an agent imparting thixotropy.

3. A resin laminated-type IC card, comprising:
   a circuit substrate; and
   a base material adhered onto the circuit substrate by lamination via the heat curable adhesive according to claim 1.

4. A resin laminated-type IC card, comprising:
   a circuit substrate; and
   a base material adhered onto the circuit substrate by lamination via the heat curable adhesive according to claim 2.

5. The heat curable adhesive according to claim 1, wherein the styrene-maleic anhydride copolymer is included in an amount of 1 to 30 parts by mass with respect to 100parts by mass of the non-crystalline polyester resin.

6. The heat curable adhesive according to claim 1, wherein the styrene-maleic anhydride copolymer is included in an amount of 2 to 15 parts by mass with respect to 100parts by mass of the non-crystalline polyester resin.

7. The heat curable adhesive according to claim 2, wherein the agent imparting thixotropy comprises at least one of micropowder silica, pulverized silica, organic bentonite, talc, smectite, clay, and a polyamide resin.

8. The heat curable adhesive according to claim 2, wherein the agent imparting thixotropy is micropowder silica.

9. The heat curable adhesive according to claim 8, wherein the styrene-maleic anhydride copolymer is included in an amount of 2 to 15 parts by mass with respect to 100parts by mass of the non-crystalline polyester resin.

10. The heat curable adhesive according to claim 9, wherein the styrene-maleic anhydride copolymer is included in an amount of 5 to 15 parts by mass with respect to 100parts by mass of the non-crystalline polyester resin.

11. The heat curable adhesive according to claim 9, wherein the styrene-maleic anhydride copolymer is included in an amount of 5 to 10 parts by mass with respect to 100parts by mass of the non-crystalline polyester resin.

12. A resin laminated-type IC card, comprising:
    a circuit substrate;
    a base material laminated onto the circuit substrate; and
    a heat-cured adhesive adhering the circuit substrate and the base material, the heat-cured adhesive being obtained by applying heat to the heat curable adhesive according to claim 1 such that the non-crystalline polyester resin is reacted with the styrene-maleic anhydride copolymer.

13. A resin laminated-type IC card, comprising:
    a circuit substrate; and
    a base material laminated onto the circuit substrate; and
    a heat-cured adhesive adhering the circuit substrate and the base material, the heat-cured adhesive being obtained by applying heat to the heat curable adhesive according to claim 9 such that the non-crystalline polyester resin is reacted with the styrene-maleic anhydride copolymer.

* * * * *